United States Patent
Henley et al.

[11] 3,910,780
[45] Oct. 7, 1975

[54] SEPARATIVE BARRIER FOR PREFERENTIAL TRANSPORT OF $CO_2$ AND APPARATUS EMPLOYING SAME

[75] Inventors: Julian L. Henley, New York, N.Y.; Sanlu Y. Chang, Lexington, Mass.

[73] Assignee: Hydro-membronics, Inc., New York, N.Y.

[22] Filed: June 14, 1973

[21] Appl. No.: 370,154

[52] U.S. Cl. .................. 55/158; 55/68; 128/142.2
[51] Int. Cl.² .................. B01D 13/00; B01D 53/22
[58] Field of Search .......... 55/16, 158, 68; 128/142, 128/142.2

[56]  References Cited
UNITED STATES PATENTS

| | | |
|---|---|---|
| 3,228,394 | 1/1966 | Ayres .................................... 55/16 |
| 3,369,343 | 2/1968 | Robb ..................................... 55/16 |
| 3,447,286 | 6/1969 | Dounoucos ............................ 55/16 |
| 3,564,819 | 2/1971 | Neulander et al. .................. 55/158 |
| 3,651,618 | 3/1972 | Klein et al. ......................... 55/158 |
| 3,692,026 | 9/1972 | Tepper et al. ..................... 128/142.2 |

*Primary Examiner*—Charles N. Hart
*Assistant Examiner*—Peter A. Hruskoci
*Attorney, Agent, or Firm*—Watson Leavenworth Kelton & Taggart

[57]  ABSTRACT

Rebreather type underwater breathing apparatus is provided with a device for extracting $CO_2$ from expiration products and discharging same into the surrounding water. The extraction device functions by virtue of having external walls separating the expiration products from said water which walls are formed from a porous hydrophobic membranous element. Enhanced action is obtained when said membranous element is impregnated with an hydration catalyst for hydration of $CO_2$.

19 Claims, 5 Drawing Figures

U.S. Patent  Oct. 7, 1975  3,910,780
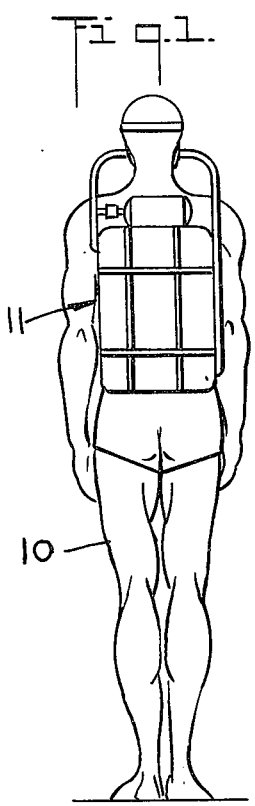
Fig. 1.
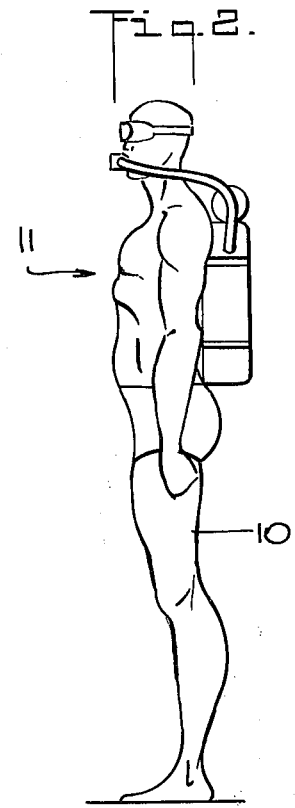
Fig. 2.
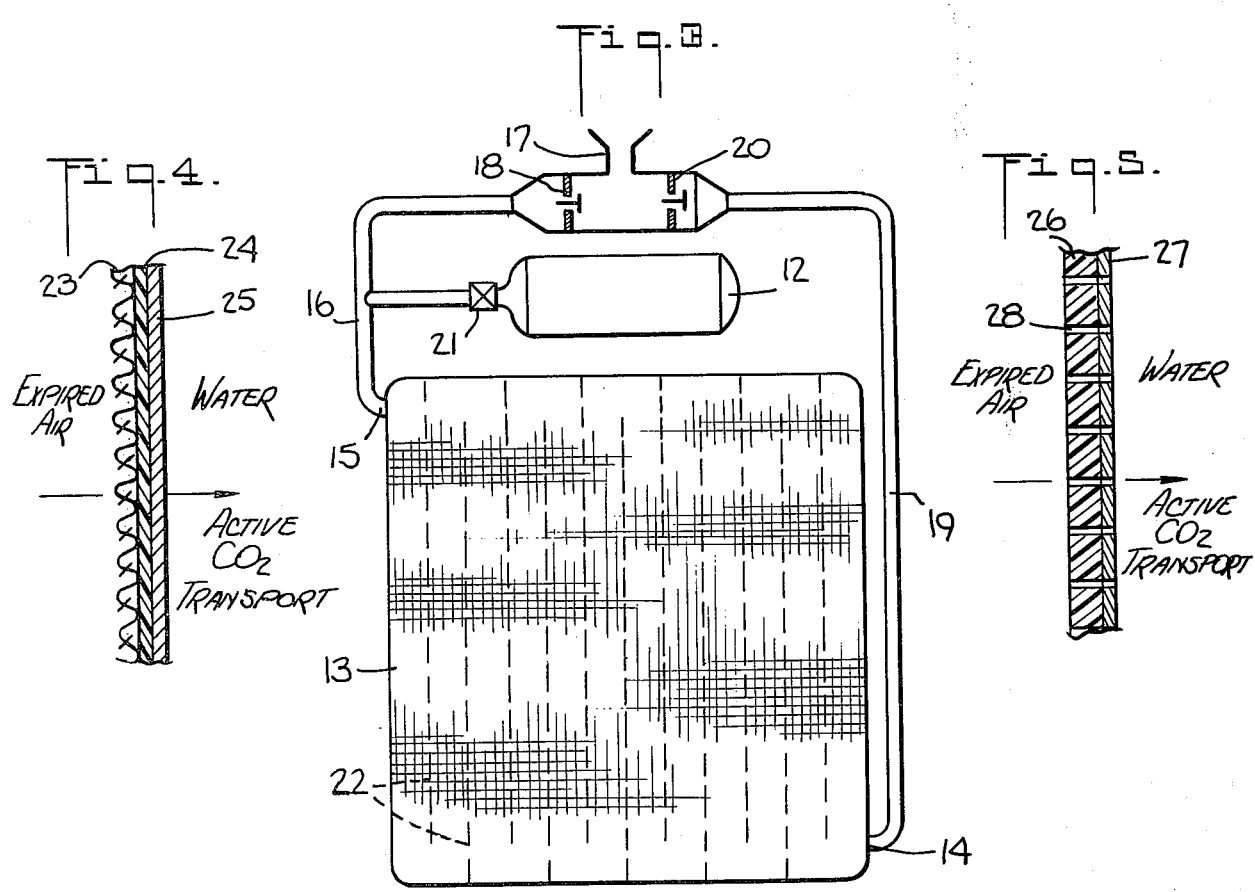
Fig. 3.
Fig. 4.
Fig. 5.

SEPARATIVE BARRIER FOR PREFERENTIAL TRANSPORT OF CO₂ AND APPARATUS EMPLOYING SAME

DISCLOSURE

The present invention relates to the separation under water of $CO_2$ from a mixture of $CO_2$ and other gases. More particularly, it relates to apparatus for accomplishing such separation at a relatively rapid rate with high efficiency.

While not limited thereto, the present invention is especially suited to removing $CO_2$ from a life support system, and particularly from underwater breathing apparatus of the rebreather type. As is well known, basic underwater breathing apparatus (usually referred to as scuba equipment) consists of one or more pressurized air tanks equipped with a demand valve and a breathing mask or mouthpiece including an arrangement of check valves whereby air is inhaled from the tanks and exhaled directly into the water. Since the human body utilizes only a minor proportion of the air inspired with the major proportion being exhaled to purge the lungs of $CO_2$, the conventional apparatus is very wasteful. Typically, a diver using such conventional basic apparatus is limited to about 20 minutes under water at a depth of 100 feet.

To extend diving time, there has been experimentation with closed circuit rebreather systems relying on the use of chemicals to absorb $CO_2$ from expired air. Calcium oxide has been used for this purpose but not without considerable risk since calcium oxide converts to a caustic in the presence of moisture and it is limited as to the quantity of $CO_2$ that it can absorb.

It has been known for a long time that a silicone rubber membrane, through the phenomenon known as selective solubility diffusion, will separate $CO_2$ from the other components found in air. An above water filter constructed from silicone rubber is described in U.S. Pat. No. 3,369,343. It is also suggested in said patent that the silicone rubber membrane can be used to extract oxygen and nitrogen from water to support life and such a system is described in U.S. Pat. No. 3,318,306.

A closed rebreather-respirator circuit is described in U.S. Pat. No. 3,489,144, wherein a silicone rubber membrane is used in a rebreather unit for purging $CO_2$ and water vapor from exhaled gases. The rebreather unit recycles air for rebreathing from which $CO_2$ has been purged and which has been augmented with oxygen from a supply tank. Purging air is circulated through the rebreather unit to carry off $CO_2$.

However, none of the known systems has proven satisfactory for use in self-contained underwater breathing apparatus to extend the dive time for an individual. One major drawback is the relatively low permeability of silicone rubber for $CO_2$ even though it is about five times greater than that for oxygen. Hence, the size of a unit for providing effective removal of $CO_2$ is prohibitive.

Wholly unrelated to the field of life support equipment, research has been conducted on the effect of catalysts on the reaction between $CO_2$ and water. An article, entitled "The Catalysis of the Reaction Between Carbon Dioxide and Water," published in the *Journal of the Chemical Society* (A), 1966, 812, includes at page 814 the following table of anions having catalytic activity in the foregoing reaction: $[B(OH)_4]^-$, $H_3SiO_4^-$, $H_3GeO_4^-$, $HPO_4^{--}$, $H_2PO_4^-$, $HAsO_4^{--}$, $AsO_2^-$, $SO_3^{--}$, $TeO(OH)_5^-$, $Te(OH)_4O_2^{--}$, $HTeO_3^-$, $ClO^-$, $BrO^-$, $SeO_3^{--}$, and Phenolate.

In U.S. Pat. No. 3,396,510, there is described the enhancement of the reaction of $CO_2$ with water by the addition of certain named catalysts. All of the anions of said catalysts are included in the foregoing table set forth in the above-mentioned article. Said last mentioned patent also describes the use of an immobilized liquid film as the permeable membrane with one of said catalysts being included in said liquid.

With the foregoing as background, it is an object of the present invention to provide an improved separative barrier for the preferential separation under water of $CO_2$ from a mixture of $CO_2$ and other gases.

It is a further object of the present invention to provide underwater breathing apparatus affording a very substantial increase in dive time over conventional scuba equipment.

In accordance with one aspect of the present invention, there is provided a separative barrier for the preferential separation under water of $CO_2$ from a mixture of $CO_2$ and other gases which comprises a structural matrix for confining said mixture under water with active preferential transport of $CO_2$ through said matrix to said water. Said matrix includes a membranous element which is at the same time porous, hydrophobic and impregnated with an hydration catalyst for hydration of $CO_2$.

In accordance with a further aspect of the present invention, there is provided underwater breathing apparatus comprising in combination means for storing under pressure a life supporting gaseous medium, means for preferentially transporting $CO_2$ from a gaseous mixture to water, said last mentioned means comprising a container having an inlet and an outlet and walls for excluding water from its interior, said walls at least in part consisting of a structural matrix as defined above, a pressure regulated outlet coupled to said storing means, respiratory tract coupling means, means coupling both said pressure regulated output and said container outlet to said respiratory tract coupling means for supplying life supporting gas thereto on demand, and means for feeding expiration from said respiratory tract coupling means to said container inlet, said expiration being conducted through said container from said container inlet to said container outlet in contact with said structural matrix.

Further objects and advantages will occur to those skilled in the subject art upon reading the following detailed description of the presently preferred embodiments thereof with reference to the appended drawings in which:

FIG. 1 is a rear view of a diver equipped with underwater breathing apparatus constructed in accordance with the subject invention;

FIG. 2 is a side view of the diver of FIG. 1;

FIG. 3 is a plan view partially schematic illustrating the breathing apparatus employed by the diver in FIGS. 1 and 2;

FIG. 4 is a diagrammatic sectional view through a structural matrix as employed in the breathing apparatus of FIG. 3; and FIG. 5 is a view similar to FIG. 4 showing a modification thereof.

The same reference numerals are used throughout the various figures of the drawings to designate the same or similar parts.

Referring now to FIGS. 1, 2 and 3, there is shown a typical diver 10 equipped for underwater activity with underwater breathing apparatus 11. The apparatus 11 includes a pressure tank 12 for storing under pressure a life supporting gaseous medium. In the present example, such medium is preferably a mixture of seven parts oxygen and one part nitrogen. A container 13 having an inlet 14 and an outlet 15 has said outlet 15 connected by tubing 16 to a mouthpiece 17 for coupling in the usual manner with the respiratory tract of the diver. A check valve 18 is provided between the mouthpiece 17 and tubing 16, as shown. Another section of tubing 19 interconnects the inlet 14 of the container 13 with the mouthpiece 17 and includes a check valve 20, as shown. A demand valve 21 is interposed between the tank 12 and the tubing 16.

The container 13 has a substantial portion of its exposed walls formed from a structural matrix which includes a porous hydrophobic membranous element. The interior of the container 13 may be provided with baffles shown diagrammatically at 22 for causing the gas flowing through the container between the inlet 14 and the outlet 15 to follow a serpentine or labyrinthian path. The interior may be constructed in any well-known manner for causing the gas as it passes through the container to come in contact with the aforementioned structural matrix material which will now be described.

Referring to FIG. 4, there is shown in detail the structural matrix wall from which the container 13 may be constructed. The base element is in the form of a woven polyester mono-filament fabric 23 which has been impregnated with a non-wetting agent selected from the group consisting of silicone and fluorocarbon resins. Said non-wetting agent is shown diagrammatically in FIG. 4 by the layer 24. It should be understood that said non-wetting agent penetrates the pores of said fabric 23 without sealing such pores. The coated fabric is thus both hydrophobic and porous. This, in turn, may be impregnated with an hydration catalyst for hydration of $CO_2$. The catalyst when provided as an impregnant is shown schematically by the layer 25. However, since water other than distilled water normally contains at least some of the anions known to afford catalytic action for the transport of $CO_2$, specific impregnation of the matrix element with a catalyst may be omitted.

In one presently preferred construction of the matrix or membrane illustrated in FIG. 4, use was made of a fabric of polyester mono-filament having a thread count of approximately 41 × 34, a thickness of about 12½ mil, and a weight of approximately 2½ ounces per sq. yd. Such fabric was purchased from Stern and Stern Textiles, Inc. of Hornell, N.Y., under their style number 15622. Said fabric was spray coated with a polytetrafluoroethylene coating obtained from Bel-Art Products of Pequannock, N.J., and identified by that company as solution No. F24012 which said company markets under their trademark "Fluo-Kem." Said coated fabric was then impregnated with calcium hypochlorate. Through laboratory experiments it has been clearly established that a submerged container provided with a wall of porous hydrophobic membranous material produced as described above contains oxygen for an indefinite period while releasing $CO_2$ at a rapid rate.

As shown in FIG. 4, $CO_2$ is actively transported from expired air through the wall of the structural matrix to the surrounding water. The chemical reaction involves the combination of $CO_2$ with the water to produce carbonic acid which then dissociates to yield bicarbonate and hydrogen ions. As explained in the above-mentioned article on the catalysis of said reaction, any material may be used as a catalyst which contains anions selected from at least one member of the group consisting of those set forth in the aforementioned table.

Other porous hydrophobic membranous elements may be employed in addition to the type described with reference to FIG. 4. For example, as shown in FIG. 5, instead of the woven fabric, use may be made of a layer of porous polymer 26 where the polymer is selected from the group consisting of polytetrafluoroethylene and polypropylene. If desired, the surface of the porous polymer can be impregnated with an hydration catalyst selected from the above mentioned group of catalysts in order to enhance the $CO_2$ transport efficiency. This is shown diagrammatically by the layer 27. As also shown in FIG. 5, the pores such as 28 pass through the layer 27 such that $CO_2$ can pass through said pores and reach the interface with the surrounding water.

Referring again to FIG. 3, it should be understood that when the diver inhales, via mouthpiece 17, air or a breathing mixture will be drawn both from the tank 12 and from the container 13 via the check valve 18. When the diver exhales the expired air or gaseous mixture will pass through the check valve 20 and through the tubing 19 and inlet 14 into the container 13. Thereupon the gaseous mixture will be exposed to the porous hydrophobic membranous walls of the container 13 for extraction of the $CO_2$.

To summarize, the porous structure should be constructed from a base element having pores no greater than 50 microns and having the necessary tensile strength for withstanding the pressures in use. Suitable structural support members, not shown in the accompanying drawings, may be incorporated in any known manner. The base member must be hydrophobic in nature either by virtue of its own characteristics or because of a surface treatment. Finally, a suitable catalyst can be included for enhancing the reaction of $CO_2$ with water. Although not previously mentioned, carbonic anhydrase is also useful as a catalyst. The pores themselves must be hydrophobic and of a size and shape which affords freedom from clogging.

Experimentation has revealed that a membrane constructed in accordance with the present invention will transport $CO_2$ at a rate of 1240 ml/min/m$^2$/atm. To afford a further indication of the efficacy of the subject invention, it is estimated that a working diver having a weight of 160 lbs. and consuming oxygen at the rate of 750 ml/min with an alveolar ventilation of 18 l/min could remain submerged at a depth of 100 feet employing the subject rebreather system along with a tank capacity of 72 cu. ft. holding an oxygen-nitrogen mixture in the ratio of 7 to 1 for a period of approximately 20 hours. By way of contrast, the same diver using a tank filled with ordinary air and without the rebreather system of the present invention could remain submerged at a depth of 100 feet for only approximately 30 minutes.

While the subject invention has been described with reference to the elimination of $CO_2$ from underwater breathing apparatus, it is not limited thereto. With minor modifications, the structural matrix of the subject invention can be used as an improved oxygenator for open heart surgery. It also can be used for producing a portable artificial lung for patients suffering from chronic pulmonary insufficiency.

For many years plastic surgeons have had difficulties in management and care of burned patients. Active research has been conducted seeking development of an artificial skin. The structural matrix of the subject invention may be used for temporary protection of a burn as said matrix possesses numerous properties of a primitive skin.

Having described the subject invention with reference to the presently preferred embodiments thereof, it will be understood that numerous changes may be made therein without departing from the true spirit of the invention as defined in the appended claims.

What is claimed is:

1. A separative barrier for the preferential separation under water of $CO_2$ from a mixture of $CO_2$ and other gases, comprising a porous structural matrix for confining said mixture under water with active preferential transport of $CO_2$ through said matrix to said water, said matrix including a membranous element which is at the same time porous, hydrophobic, impregnated with an hydration catalyst for hydration of $CO_2$ and exposed on opposite sides for direct contact with said water and said mixture, respectively.

2. A separation barrier according to claim 1, wherein said membranous element consists essentially of a woven polyester mono-filament fabric impregnated with a non-wetting agent selected from the group consisting of silicone and fluorocarbon resins.

3. A separative barrier according to claim 1, wherein said membranous element consists essentially of a layer of porous polymer where the polymer is selected from the group consisting of polytetrafluoroethylene and polypropylene.

4. A separative barrier according to claim 1, wherein said catalyst contains anions selected from at least one member of the group consisting of $[B(OH)_4]^-$, $H_3SiO_4^-$, $H_3GeO_4^-$, $HPO_4^{--}$, $H_2PO_4^-$, $HAsO_4^{--}$, $AsO_2^-$, $SO_3^{--}$, $TeO(OH)_5^-$, $Te(OH)_4O_2^{--}$, $HTeO_3^-$, $ClO^-$, $BrO^-$, $SeO_3^{--}$, and Phenolate.

5. A separative barrier according to claim 4, wherein said membranous element consists essentially of a woven polyester mono-filament fabric impregnated with a non-wetting agent selected from the group consisting of silicone and fluorocarbon resins.

6. A separative barrier according to claim 4, wherein said membranous element consists essentially of a layer of porous polymer where the polymer is selected from the group consisting of polytetrafluoroethylene and polypropylene.

7. Underwater breathing apparatus comprising in combination means for storing under pressure a life supporting gaseous medium, means for preferentially transporting $CO_2$ from a gaseous mixture to water, said last mentioned means comprising a container having an inlet and an outlet and walls for excluding water from its interior, said walls at least in part consisting of a porous structural matrix including a membranous element which is at the same time porous, hydrophobic, impregnated with an hydration catalyst for hydration of $CO_2$ and exposed on opposite sides for direct contact with said water and said mixture, respectively, a pressure regulated outlet coupled to said storing means, respiratory tract coupling means, means coupling both said pressure regulated output and said container outlet to said respiratory tract coupling means for supplying life supporting gas thereto on demand, and means for feeding expiration from said respiratory tract coupling means to said container inlet, said expiration being conducted through said container from said container inlet to said container outlet in contact with said membranous element.

8. Underwater breathing apparatus according to claim 7, wherein said membranous element consists essentially of a woven polyester mono-filament fabric impregnated with a non-wetting agent selected from the group consisting of silicone and fluorocarbon resins.

9. Underwater breathing apparatus according to claim 7, wherein said membranous element consists essentially of a layer of porous polymer where the polymer is selected from the group consisting of polytetrafluoroethylene and polypropylene.

10. Underwater breathing apparatus according to claim 7, wherein said catalyst contains anions selected from at least one member of the group consisting of $[B(OH)_4]^-$, $H_3SiO_4^-$, $H_3GeO_4^-$, $HPO_4^{--}$, $H_2PO_4^-$, $HAsO_4^{--}$, $AsO_2^-$, $SO_3^{--}$, $TeO(OH)_5^-$, $Te(OH)_4O_2^{--}$, $HTeO_3^-$, $ClO^-$, $BrO^-$, $SeO_3^{--}$, and Phenolate.

11. Underwater breathing apparatus according to claim 10, wherein said membranous element consists essentially of a woven polyester mono-filament fabric impregnated with a non-wetting agent selected from the group consisting of silicone and fluorocarbon resins.

12. Underwater breathing apparatus according to claim 10, wherein said membranous element consists essentially of a layer of porous polymer where the polymer is selected from the group consisting of polytetrafluoroethylene and polypropylene.

13. Apparatus for use in underwater breathing apparatus for eliminating $CO_2$ from expiration comprising a container having an inlet and an outlet and walls for excluding water from its interior, said walls at least in part consisting of a porous structural matrix including a membranous element with exposed surfaces which is at the same time porous, hydrophobic and impregnated with an hydration catalyst for hydration of $CO_2$, and means for conducting expiration through said container from said inlet to said outlet in contact with said membranous element.

14. Underwater breathing apparatus according to claim 13, wherein said membranous element consists essentially of a woven polyester mono-filament fabric impregnated with a non-wetting agent selected from the group consisting of silicone and fluorocarbon resins.

15. Underwater breathing apparatus according to claim 13, wherein said membranous element consists essentially of a layer of porous polymer where the polymer is selected from the group consisting of polytetrafluoroethylene and polypropylene.

16. Underwater breathing apparatus according to claim 13, wherein said catalyst contains anions selected from at least one member of the group consisting of $[B(OH)_4]^-$, $H_3SiO_4^-$, $H_3GeO_4^-$, $HPO_4^{--}$, $H_2PO_4^-$, $HAsO_4^{--}$, $AsO_2^-$, $SO_3^{--}$, $TeO(OH)_5^-$, $Te(OH)_4O_2^{--}$, $HTeO_3^-$, $ClO^-$, $BrO^-$, $SeO_3^{--}$, and Phenolate.

17. Underwater breathing apparatus according to claim 16, wherein said membranous element consists essentially of a woven polyester mono-filament fabric impregnated with a non-wetting agent selected from the group consisting of silicone and fluorocarbon resins.

18. Underwater breathing apparatus according to claim 16, wherein said membranous element consists essentially of a layer of porous polymer where the polymer is selected from the group consisting of polytetrafluoroethylene and polypropylene.

19. A separative barrier for the preferential transport of $CO_2$ from a mixture of $CO_2$ and other gases, consisting of a porous structural matrix having a membranous element with exposed surfaces which is at the same time porous, hydrophobic and impregnated with an hydration catalyst for hydration of $CO_2$.

* * * * *